United States Patent
Perinchery et al.

(10) Patent No.: US 12,346,375 B2
(45) Date of Patent: Jul. 1, 2025

(54) AUTOMATED ENHANCEMENT OF METADATA IN MEDIA PROGRAM DATABASE

(71) Applicant: DISH Network Technologies India Private Limited, Karnataka (IN)

(72) Inventors: Melvin Perinchery, Bengaluru (IN); Shanmugam Ramaswamy, Bengaluru (IN)

(73) Assignee: DISH Network Technologies India Private Limited (IN)

( * ) Notice: Subject to any disclaimer, the term of this patent is extended or adjusted under 35 U.S.C. 154(b) by 0 days.

(21) Appl. No.: 18/439,481

(22) Filed: Feb. 12, 2024

(65) Prior Publication Data

US 2025/0173375 A1    May 29, 2025

(30) Foreign Application Priority Data

Nov. 28, 2023   (IN) .............................. 202341080764

(51) Int. Cl.
*G06F 16/73*    (2019.01)
*G06F 16/732*   (2019.01)
*G06F 16/783*   (2019.01)

(52) U.S. Cl.
CPC ........ *G06F 16/783* (2019.01); *G06F 16/7343* (2019.01)

(58) Field of Classification Search
CPC ............................ G06F 16/783; G06F 16/7343
See application file for complete search history.

(56) References Cited

U.S. PATENT DOCUMENTS

| | | | |
|---|---|---|---|
| 5,623,652 A * | 4/1997 | Vora | G06F 16/332 |
| | | | 707/E17.061 |
| 6,944,612 B2 * | 9/2005 | Roustant | G06F 16/9535 |
| | | | 715/275 |
| 8,838,597 B1 * | 9/2014 | Gottumukkala | G06F 16/901 |
| | | | 707/740 |
| 11,726,994 B1 * | 8/2023 | Wang | G06F 16/24573 |
| | | | 707/769 |
| 11,934,440 B2 * | 3/2024 | Maucec | G06F 16/355 |
| 12,164,536 B2 * | 12/2024 | Pantar | A23L 29/269 |
| 2005/0114381 A1 * | 5/2005 | Borthakur | G06F 16/10 |
| | | | 707/999.102 |
| 2005/0203970 A1 * | 9/2005 | McKeown | G06Q 10/10 |
| | | | 707/999.203 |
| 2015/0046537 A1 * | 2/2015 | Rakib | G11B 27/34 |
| | | | 709/204 |
| 2017/0068683 A1 * | 3/2017 | Bakshi | G06F 16/245 |
| 2017/0235848 A1 * | 8/2017 | Van Dusen | G06Q 10/101 |
| | | | 705/12 |
| 2017/0255524 A1 * | 9/2017 | McGrath | G06F 11/1451 |
| 2018/0350144 A1 * | 12/2018 | Rathod | G06Q 20/3224 |
| 2021/0049160 A1 * | 2/2021 | Fuerst | G06F 16/288 |

(Continued)

*Primary Examiner* — Eliyah S. Harper
(74) *Attorney, Agent, or Firm* — KW Law, LLP

(57) ABSTRACT

Systems, devices and automated processes are described for automated enhancement of metadata in a database of information about movies, television shows or other media programs. Gaps or errors in metadata describing the different programs in the database can be corrected using a digital architecture in which one or more sources are queried for missing information. Queries may be directed toward a large language model (LLM) or other artificial intelligence (AI) engine, if desired.

17 Claims, 3 Drawing Sheets

(56) References Cited

U.S. PATENT DOCUMENTS

2022/0198572 A1\* 6/2022 Aggarwal .............. G06N 20/00
2022/0245093 A1\* 8/2022 Batsakis ............... G06F 16/144
2022/0300499 A1\* 9/2022 Werner ............. G06F 16/24534
2024/0119045 A1\* 4/2024 Aggarwal ......... G06F 16/24556
2024/0354340 A1\* 10/2024 Sriramulu ............. G06F 16/587

\* cited by examiner

AUTOMATED ENHANCEMENT OF METADATA IN MEDIA PROGRAM DATABASE

PRIORITY CLAIM

This application claims priority to India Provisional Patent Application No. 202341080764 filed on Nov. 28, 2023, which is incorporated herein by reference. A Foreign Filing License No. POC/FA4980CHE2023/2023-5127 has been obtained from the India Patent Office, and WIPO has issued DAS code F67D.

TECHNICAL FIELD

The following generally relates to automated enhancement of database records relating to movies, television programs and other audio/visual media content. More particularly, the following relates to systems, devices and automated processes to enhance metadata regarding media programs that are stored in a database. Some implementations may make use of artificial intelligence (AI) constructs, as described herein.

BACKGROUND

Electronic Program Guides (EPGs) are an important part of modern media viewing. Typically, the EPG provides a digital menu system that provides users with continuously updated menus displaying available programming as well as scheduling information for current and upcoming programming. EPGs are an important part of modern digital broadcasting services, including satellite, cable TV, and over-the-top (OTT) streaming platforms. Other media delivery services often provide EPG-type databases related to the content available from that service.

More recently, viewers have come to expect a wealth of data about the programs that they are considering. Modern EPGs provide not only title and schedule information, but also information about the program such as identification of actors and actresses, directors, producers and other people involved in creating the program. Some guides additionally provide other information such as release date, any awards that the program may have been nominated for or won, brief summary of the plot of the program, and/or any other information of interest to the viewers. This information may be available for browsing, searching, or other functions as desired.

Usually, EPG data is maintained in an electronic database that includes records for each program available. Creating and updating records for all of the programs in the database can be a substantial chore. Program data is available from several commercial databases, but each of these services has limitations in terms of formatting, data availability, limited information available for each program, and so forth. Creating a database of consistent and complete data often requires a substantial amount of manual research and data entry, which can be expensive, cumbersome and prone to human error.

A substantial desire therefore exists to build systems, devices and automated processes that allow for automated creation and updating of database records relating to programs available from a media delivery service. These and other features are described in increasing detail below.

BRIEF DESCRIPTION

Systems, devices and automated processes are described to automatically create and/or update database records associated with an electronic program guide or other database of media programs. The system suitably includes a mapping service that initially populates database records or other metadata with information from a primary service, and that uses an artificial intelligence (AI) engine to identify additional information that is missing from the primary record, and to automatically obtain the missing information using natural language queries or the like. The AI engine may also be used to validate the database records, thereby identifying any errors or discrepancies in the information received from the primary source.

In one example, a data processing system suitably comprises a database and a mapping service that is implemented using one or more processors and non-transitory data storage. The database is appropriately configured to store data records relating to media programs, and each of the data records comprises a plurality of data fields representing metadata about one or more of the media programs. The mapping service comprises a rules engine that is configured to: populate at least some of the data fields with metadata received from a first data source that is accessible to the data processing system via a network; identify one or more missing data fields that was not populated with metadata received from the first data source; automatically format a query to be placed to a second data source that is different from the first data source to obtain additional information about the media program for the one or more missing data fields; place the query to the second data source to responsively receive the additional information about the media program from the second data source; update the one or more missing data fields about the media program with the additional information received from the second data source; and store the updated metadata about the media program including the additional information in the database for subsequent retrieval. In some embodiments, the second data source is a large language module (LLM) associated with an artificial intelligence (AI) service that is accessible via the network, and/or the mapping service comprises a natural language engine that is configured to automatically format the query to the second data source as a natural language query.

In another example, an automated process is performed by a computer system to manage information about a media program in a database. The automated process suitably comprises: receiving metadata about the media program from a first data source that is accessible to the computer system via a network; identifying one or more missing data fields in the metadata about the media program; automatically formatting a query related to the one or more missing data fields to obtain additional information about the media program from a second source that is accessible to the computer system via the network, wherein the second source is different from the first source; automatically placing the query to the second data source and responsively receiving additional information about the media program from the second data source; updating the one or more missing data fields in the metadata about the media program with the additional information from the second data source; and storing the updated metadata about the media program including the additional information in the database for subsequent retrieval.

Still other embodiments relate to a computer system comprising a processor, a non-transitory digital storage and an interface to a network. The non-transitory digital storage comprises computer-executable instructions stored thereon that, when executed by the processor, perform an automated process. The automated process suitably comprises: receiving metadata about the media program from a first data source that is accessible to the computer system via the network; identifying one or more missing data fields in the metadata about the media program; automatically formatting a query related to the one or more missing data fields to obtain additional information about the media program from a second source that is accessible to the computer system via the network, wherein the second source is different from the first source; automatically placing the query to the second data source and responsively receiving additional information about the media program from the second data source; updating the one or more missing data fields in the metadata about the media program with the additional information from the second data source; and storing the updated metadata about the media program including the additional information in the database for subsequent publication to an electronic program guide service.

Additional embodiments provide other systems, devices, computing systems and automated processes substantially as described herein, and/or their legal equivalents.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems, devices and automated processes are described for automated enhancement of metadata in a database of information about movies, television shows or other media programs. Gaps or errors in metadata describing the different programs in the database can be corrected using a digital architecture in which one or more sources are queried for missing information.

Queries for metadata information may be directed toward a large language model (LLM) or other artificial intelligence (AI) engine, if desired. The AI engine could be used to populate new data in a currently-existing database and/or to fill in gaps in the database by querying for missing information, if desired. The AI could also be used to verify information already present in the database by checking against another data source. Similar features could be equivalently built and used in any number of equivalent embodiments.

Figure 1:
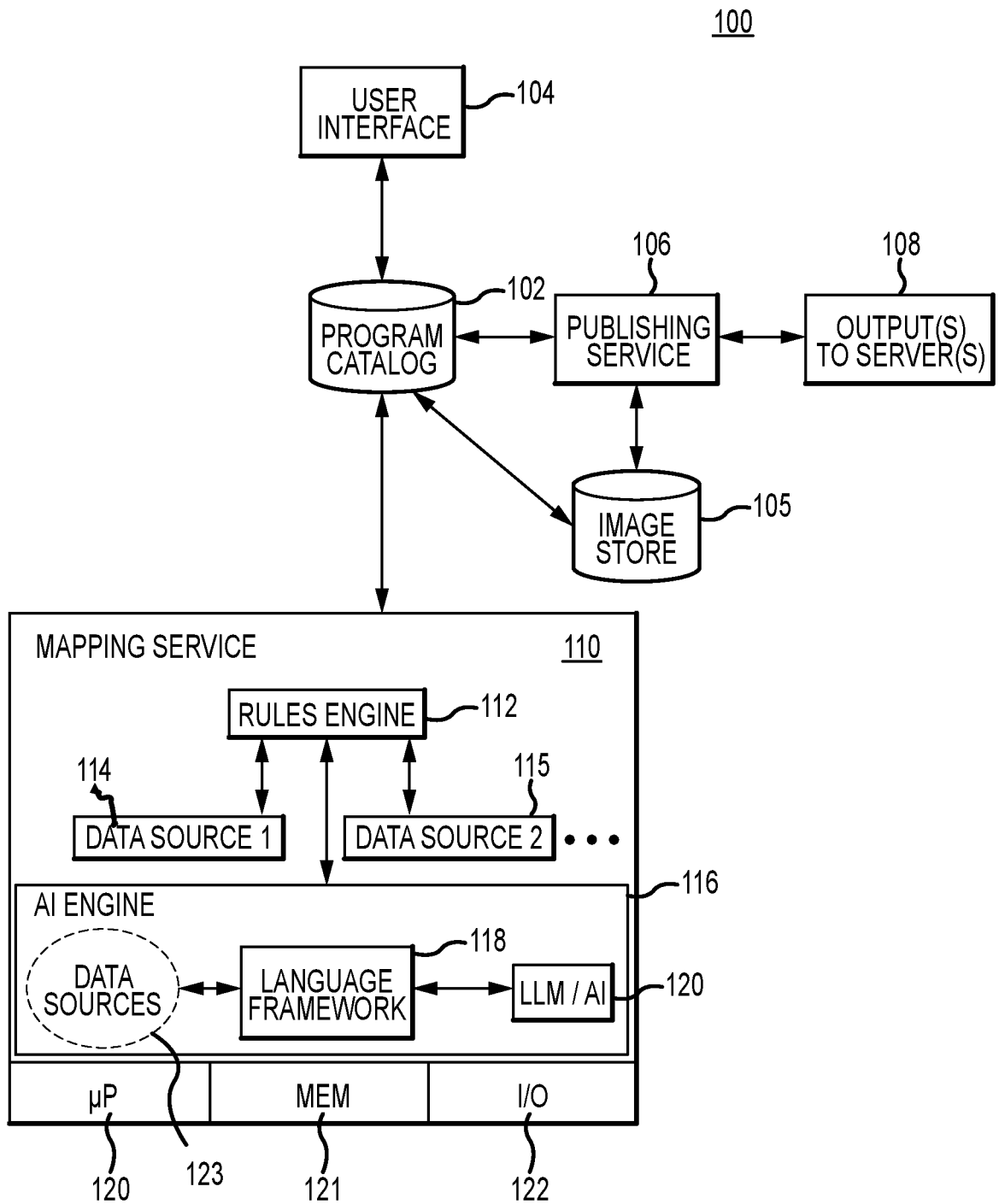
FIG. 1 illustrates an example system for automated updating of metadata relating to media programs.

With reference now to FIG. 1, a new computing architecture 100 is provided to maintain and enrich the metadata in a database 102 of program information that feeds an electronic program guide (EPG) or similar service(s) 108. Metadata describing the various records in the database 102 is filled and/or updated using a mapping service 110 that operates in response to a rules engine 112 or other control logic executed by processor 120. In various embodiments, database records are initially populated based upon information available from one or more data sources 114, 115, with that information being updated or supplemented using an AI engine 116, if desired. AI engine 116 suitably makes use of a large language model (LLM) or the like that is locally supported and/or that is available via a network. AI engine 116 may also place natural language or other queries for additional information to additional data sources, as appropriate. Such information can be provided via the Internet or another digital network. Additional data sources could include publicly available sources (e.g., Wikipedia), as well as any information available to the AI engine, as desired. AI engine 116 may also perform validation of information received from data sources 114, 115 if desired, and/or may perform format conversion or correction of metadata as appropriate.

Examples of primary data sources 114, 115 could include, without limitation, services such as the GRACENOTE media database service available from Gracenote, Inc. of Emeryville, California or the IMDB service maintained by Amazon Inc. of Seattle, Washington, although additional and/or alternate services could be equivalently used. In some embodiments, the metadata associated with a particular program is initially populated with information obtained from one of the data sources 114, 115, as appropriate, using APIs or other interfaces provided by the service. Generally, these sources 114, 115 provide information associated with particular media programs in a known format, such as an XML or SOAP schema having known headings, data fields and the like. If database 102 operates with a different format or schema than that provided by the data sources 114, 115, then rules engine 112 may perform format conversion as needed.

Gaps in the metadata can occur for any number of reasons. The formatting of database 102 may provide data fields for information that is not available from the primary sources 114, 115, for example. Sources 114, 115 may be incomplete for any reason, and/or the data about the media program may change over time (e.g., as programs are remastered or re-released, as additional awards or honors are received, etc.). Metadata can therefore by updated, validated and/or supplemented using an AI engine 16 or the like.

In the example of FIG. 1, AI engine 116 includes a natural language framework 118 and an AI engine 120. In various embodiments, the natural language framework 118 can be used to formulate natural language queries that are placed to secondary data sources 120 such as any LLM or other artificial intelligence service. AI service 120 may be locally-executing within the mapping service 110, if desired, and/or it may be an external service that is accessible via the Internet or another network. AI services 120 may be accessible via published application program interfaces (APIs), for example, or using conventional HTTP-type messaging, depending upon the particular service that is used. Additional information about the formatting of natural language queries and use of AI services is provided below in conjunction with FIGS. 2-3.

Information in database 102 can be used in any manner. In the example of FIG. 1, a publishing service 106 extracts database information from the program database 102, along with any still or moving images, for publication or other delivery to an EPG service, a video on demand (VOD) service, a remote or local storage digital video recorder (DVR) service, and/or another other services 108 as desired. Publication service 106 could use the interface 104 to access databases 102 and 105, if desired. Alternately, a subscription service (e.g., the KAFKA event stream service provided by the Apache Software Foundation) could be used to provide a data feed from the database to the publication service 106, as desired.

In various implementations, a terminal or other user interface 104 is provided to allow human operators to make manual edits and/or to view information, if desired. Interface 104 may be implemented using an application program interface (API) and/or web interface, if desired. In either case, the administrator can connect to the interface, provide appropriate authentication credentials, and obtain access to database 102 for record creation, read, update and/or delete (CRUD) functions, as appropriate.

In an example embodiment, database 102 is implemented using a database management system (DBMS) that is compatible with structured query language (SQL) or similar protocols to permit authorized administrators to perform CRUD functions or the like using the provided interface 104. Still and/or moving images associated with the various program records may be stored in a separate image database 105, if desired, or image data can be combined with the primary program database 102, as appropriate. Generally, the database schema or other metadata stored in the primary program database 102 will include links (e.g., uniform resource locators (URLs)) or other references to the images associated with the program, thereby permitting for convenient retrieval of the images from the image database 105.

The various components of system 100 are implemented using digital hardware, software and/or firmware logic executed by one or more data processors. In the example of FIG. 1, for example, mapping service 110 is shown executing on a conventional computer system that includes hardware such as a processor 120, non-transitory digital storage 121 (e.g., magnetic, optical and/or solid state memory), and any appropriate interfaces 122 for network access and other input/output functions. The other components of system 100 are similarly implemented using computing hardware and digital programming. In some implementations, the physical hardware used to implement one or more components of system 100 may be abstracted and implemented using so-called "cloud" resources, such as the Amazon Web Services (AWS) system provided by Amazon Inc. Other embodiments could equivalently use cloud services provided by IBM, Inc., Microsoft Corporation, Google, Salesforce and/or other service providers if desired.

Figure 2:
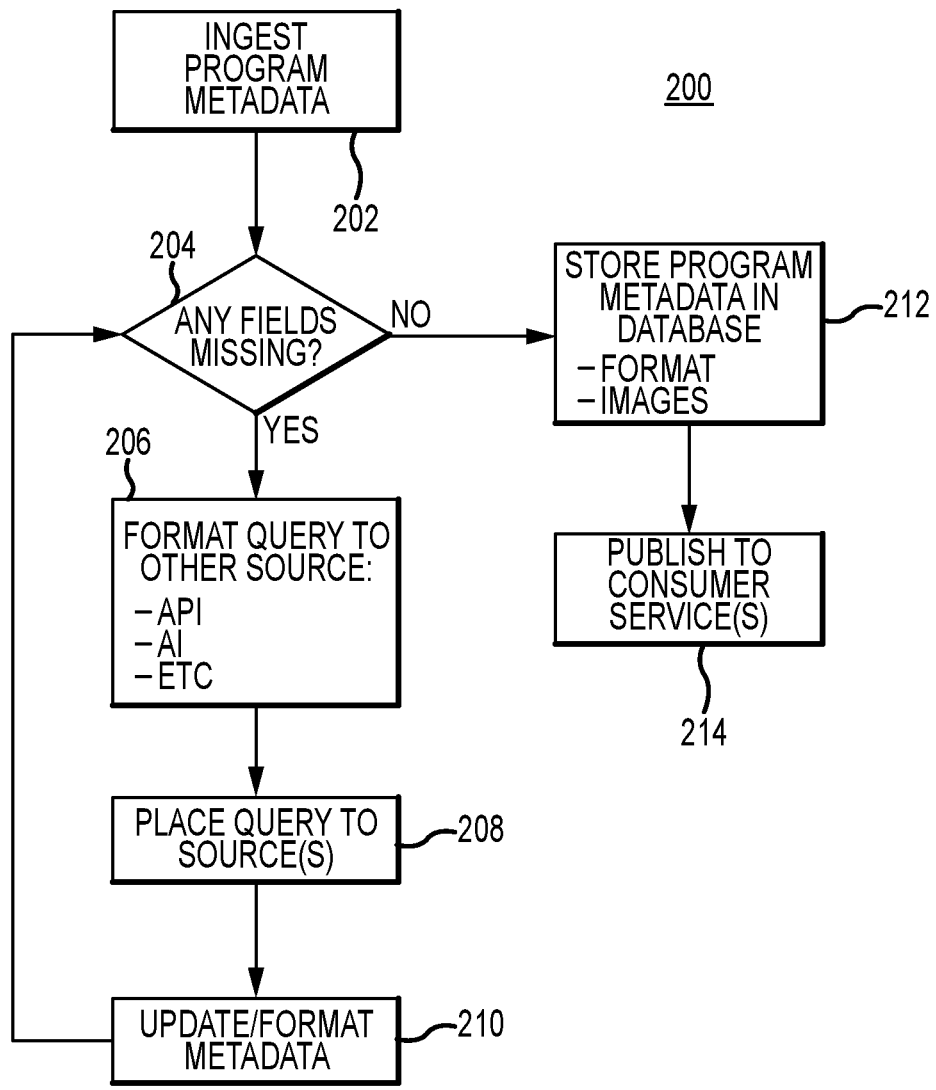
FIG. 2 illustrates an example of an automated process to automatically update metadata relating to media programs.

Turning now to FIG. 2, an example of an automated process 200 is performed by system 100 to create and update metadata relating to a database record associated with a media program. The various functions illustrated in the example of FIG. 2 may be carried out by any sort of hardware, software and/or firmware logic residing within system 100, and various embodiments may organize the various functions shown in FIG. 2 in any other manner.

Metadata for a new program to be added to the database is initially ingested in any manner (function 202). In various embodiments, metadata is initially received from a subscription-based or other data source 114, 115 such as the META-CLOUD or IMDB databases referenced a above. Metadata may be obtained by interacting with an API or other interface provided by the service. In various implementations, programs are identified by a published identifier that can be submitted to the data source 114, 115 to obtain additional information about the identified program. Other implementations may rely upon the title or owner of the program, or other identifying information as appropriate.

Generally, data sources 114, 115 will deliver requested metadata in a predetermined format, such as an XML or JSON schema or the like. If database 102 may be organized to use the same schema in some embodiments, but more typically database 102 will prefer a more complete schema that is capable of storing additional data about the various programs than a single data source 114, 115 will deliver. To that end, rules engine 112 or the like will typically convert the metadata received from the data source 114, 115 to the desired format, adding additional data fields and converting syntax as appropriate. The converted data can be stored in database 102 for subsequent retrieval (function 212). Note that even if the metadata for the record is incomplete, the available data could be stored in the database for use until the more complete information is obtained, if desired.

Frequently, the metadata record about the program will have one or more gaps corresponding to missing information that is not available from the primary program source 114, 115 (function 204). In such cases, system 100 can take any number of different actions to complete the metadata record for the program. System 100 can prompt a human operator for the missing data, for example, using interface 104 or the like. This could permit the operator to search for the missing information and to add it manually, if desired. Reports of missing information could be provided in real time, if desired, or could be batched with missing information reports from other database records so that the operator could search and provide updates at a later time, if desired.

In various implementations, missing information is automatically obtained by system 100 without manual effort by a human operator. In the example of FIG. 2, rules engine 112 or another component of system 100 appropriately formats a query that can be submitted to a secondary data source to obtain the missing information (function 206). The query may be, for example, a natural language query that can be submitted to an artificial intelligence (AI) engine, for example. Examples of AI engines that are publicly available include, without limitation, the CHATGPT engine available from OpenAI, the GOOGLE AI and TENSORFLOW services available from Google Inc, the WATSON engine available from IBM Corporation, the AZURE AI service available from Microsoft Corp., the GROK service available from X/Twitter, and/or many others. Some embodiments may make use of multiple AI engines, if desired.

In many embodiments, the AI query will be formulated as natural language. A query for award nominations associated with a particular movie, for example, could take the form of "What awards was MOVIE nominated for?". Similarly, actors and actress names could be obtained by asking "What actors and actresses appeared in MOVIE?". A language framework 118 or similar processing component of system 100 could be used to create natural language queries, if desired.

The queries may be placed via an API or public interface made available by the AI engine, if desired (function 208). Equivalently, a local version 120 of the AI engine could run locally within system 100, if desired. The LOCALGPT program, for example, allows for a locally-executing program to abstract queries placed to the OpenAI's CHATGPT service. Other AI engines (e.g., the LLAMA engine available from Meta Inc.) permit similar abstraction and/or local execution within system 100. In still other embodiments, a customized LLM or other engine could be formulated to seek out relevant information from relevant sources (e.g., Wikipedia, search engines, and/or the like).

Responses to queries are appropriately received by mapping service 110 and processed as appropriate (function 210). In the example of FIG. 2, the responses to the queries are reformatted into the schema of database 102 so that the information can be maintained and subsequently used by any number of customers. If desired, the information initially obtained from data sources 114, 115 could be spot checked using queries 206 to an AI engine or the like to verify accuracy and completeness. If desired, it may not be necessary to initially populate the program's metadata record from data sources 114, 115 if the information can be obtained entirely from queries placed to AI sources or the like.

As noted above, program metadata can be stored and maintained in database 102 for subsequent retrieval (function 212). The information may be published in any manner (function 214) (e.g., using Adobe KAFKA or the like) to any number of consumer services, such as electronic program guides for direct broadcast satellite (DBS), over-the-top (OTT) media streaming, cable and/or terrestrial broadcast television distribution systems. Equivalently, the information may be used by local and/or remote storage digital video recorders, or other media services 108 as desired.

Figure 3:
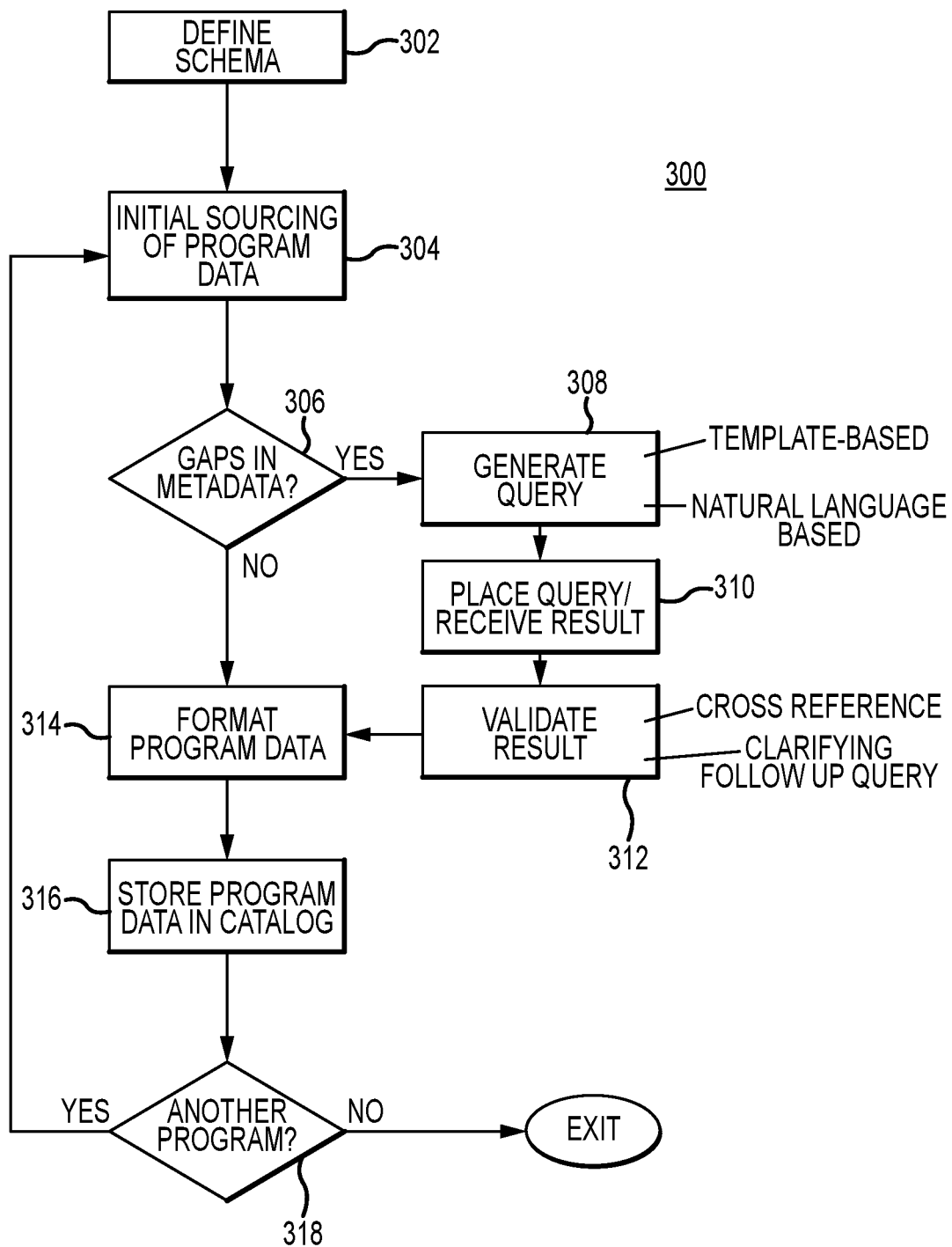
FIG. 3 illustrates an example of an automated process to automatically update metadata relating to media programs that makes use of an artificial intelligence (AI) engine.

FIG. 3 shows another example of an automated process 300 to populate metadata in a database of information about media programs that is performed by one or more components of system 100 without manual intervention by a human operator. The process shown in FIG. 3 begins with defining a schema (e.g., in XML or JSON) for each media program that will include data fields for each of the categories desired, as well as defining information about how the data is stored (function 302). The schema may contain any number of data fields, each formatted in any manner. "Actor/Actress Names", for example, may be stored within a string field of any length with commas, semicolons or other delimiting punctuation separating the multiple different entries contained within the field. As noted above, the schema may be defined in any manner. An AI may be used to define the schema, if desired.

Program metadata may be initially sourced in any manner (function 304). As noted above, data may be initially sourced from a database service 114, 115 if desired. Alternately, data may be obtained strictly from queries as set forth herein, if desired. Process 300 may also be useful in updating existing database records as information changes (e.g., a program is nominated for additional awards, or changes ownership), or if additional data fields are added to the database schema such that all of the records in database 102 need to be updated.

If one or more gaps are identified in the metadata for one or more programs (function 306), then queries can be generated to obtain the missing information from an AI or other secondary source (function 308). As noted above, queries may be natural language based, and may be based upon template language if desired. To that end, a rules engine 112 or natural language framework 118 residing within system 110 can formulate a query in a format that can be received and interpreted by the AI or other secondary source 122.

Queries are placed and results are received in any manner (function 310). As noted above, queries may be placed to a local LLM 116 or a public AI that receives the query, obtains the requisite information, and provides an appropriate response. The response will often be in a natural language format or the like. Interaction with the AI engine for queries and responses will typically take place via the API associated with the engine, using formats and protocols that are published by the service.

Responses from the AI or other secondary source can be processed as desired (function 312). In various embodiments, results can be checked against currently-held data to verify the accuracy of the information, if desired. Equivalently, queries could be placed to multiple AI engines for further verification and consistency. If discrepancies exist, logic in system 100 could create follow-up queries, if desired, to obtain clarifying information or to make the result more accurate.

Results obtained from the secondary source are formatted for storage within the predefined schema as appropriate (function 314). Often, AI engines return results in natural language format, so the raw data will typically be removed from the surrounding language for storage in the schema. A query for the cast of "Top Gun: Maverick", for example, could return a sentence such as "The main cast of the 2022 film 'Top Gun: Maverick' includes Tom Cruise, Miles Teller, Jennifer Connelly, Jon Hamm, Glen Powell, Ed Harris, Val Kilmer, Lewis Pullman, Charles Parnell, Bashir Salahuddin, Monica Barbaro, Jay Ellis, Danny Ramirez, Greg Tarzan Davis, Manny Jacinto, Raymond Lee, and Jake Picking", for example. Such a result will typically be processed to remove the leading words and to extract the names of cast members from the surrounding text. Depending upon the schema, it may be necessary to replace the commas shown with semicolons or other delimiting punctuation. Other formatting may also occur, and other data fields may need different types of formatting, as appropriate. Formatting may be performed with scripting in the Python or another programming language, or in any other manner desired. AI constructs could also be used to tailor the formatting of responses received so that additional formatting after receipt is reduced or eliminated. In such cases, received and processed data is inserted into the schema for storage in database 102. Results of the query are therefore placed in the metadata schema associated with the media program, and the record is stored in database 102 for subsequent retrieval (function 316).

The process of identifying missing metadata and querying for additional or updated information continues until the record is complete, if desired, or until all available information has been exhausted (function 318).

The various functions shown in FIGS. 2-3 may be implemented in any number of different ways. In various embodiments, one or more processors associated with system 100 (e.g., processor 120) execute software, firmware or other programmed logic to perform the various functions shown. Software may be stored in any sort of solid state, magnetic, optical or other non-transitory digital storage, such as storage 121, although other embodiments may distribute the data storage and processing functions amongst the various components of system 100 in any number of other ways. Further, some of all of the functionality illustrated in FIGS. 2-3 could be equivalently performed using cloud resources (e.g., Amazon AWS resources) if desired.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A data processing system comprising:
a database configured to store data records relating to media programs, wherein each of the data records comprises a plurality of data fields representing metadata about one or more of the media programs; and
a mapping service comprising a rules engine configured to:
populate at least some of the data fields with metadata received from a first data source that is accessible to the data processing system via a network;
identify one or more missing data fields that was not populated with metadata received from the first data source;
automatically format a query to be placed to a second data source that is different from the first data source to obtain additional information about the media program for the one or more missing data fields, wherein the second data source is a large language model (LLM) maintained by the mapping service;
place the query to the second data source to responsively receive the additional information about the media program from the second data source;
update the one or more missing data fields about the media program with the additional information received from the second data source; and
store the updated metadata about the media program including the additional information in the database for subsequent retrieval.

2. The data processing system of claim 1 wherein the large language module (LLM) is associated with an artificial intelligence (AI) service that is accessible via the network.

3. The data processing system of claim 2 wherein the mapping service comprises a natural language engine that is configured to automatically format the query to the second data source as a natural language query.

4. The data processing system of claim 1 wherein the mapping service comprises a natural language engine that is configured to automatically format the query to the second data source as a natural language query.

5. The data processing system of claim 1 further comprising a publishing service configured to retrieve the data records relating to the media programs and to forward the data records to one or more other services.

6. The data processing system of claim 1 further comprising a publishing service configured to retrieve the data records relating to the media programs and to forward the data records to an electronic program guide service.

7. An automated process performed by a computer system to manage information about a media program in a database, the automated process comprising:
receiving metadata about the media program from a first data source that is accessible to the computer system via a network;
identifying one or more missing data fields in the metadata about the media program;
automatically formatting a query related to the one or more missing data fields to obtain additional information about the media program from a second source that is accessible to the computer system via the network, wherein the second source is different from the first source, and wherein the second service is a large language model (LLM) associated with an artificial intelligence (AI) service available via the network;
automatically placing the query to the second data source and responsively receiving additional information about the media program from the second data source;
updating the one or more missing data fields in the metadata about the media program with the additional information from the second data source; and
storing the updated metadata about the media program including the additional information in the database for subsequent retrieval.

8. The automated process of claim 7 wherein the formatting comprises formatting a natural language query based upon the one or more missing data fields to be transmitted to the LLM via the network.

9. The automated process of claim 7 further comprising validating the metadata about the media program.

10. The automated process of claim 9 wherein the validating comprises placing a plurality of validation queries to an artificial intelligence (AI) service available via network.

11. The automated process of claim 10 wherein the validation queries are natural language queries that confirm the information received from the first data source.

12. The automated process of claim 11 further comprising updating the metadata associated with the media program with validation results received from the AI service.

13. The automated process of claim 7 further comprising formatting the metadata about the media program according to a schema prior to storing the metadata in the database.

14. The automated process of claim 7 further comprising publishing the stored metadata to one or more consumer services.

15. The automated process of claim 7 further comprising publishing the stored metadata to an electronic program guide service.

16. A computer system comprising a processor, a non-transitory digital storage and an interface to a network, wherein the non-transitory digital storage comprises computer-executable instructions stored thereon that, when executed by the processor, performs an automated process comprising:
- receiving metadata about the media program from a first data source that is accessible to the computer system via the network;
- identifying one or more missing data fields in the metadata about the media program;
- automatically formatting a query related to the one or more missing data fields to obtain additional information about the media program from a second source that is accessible to the computer system via the network, wherein the second source is different from the first source, and wherein the second service is a large language model (LLM) associated with an artificial intelligence (AI) service available via the network;
- automatically placing the query to the second data source and responsively receiving additional information about the media program from the second data source;
- updating the one or more missing data fields in the metadata about the media program with the additional information from the second data source; and
- storing the updated metadata about the media program including the additional information in the database for subsequent publication to an electronic program guide service.

17. The computer system of claim 16 wherein the formatting comprises formatting a natural language query based upon the one or more missing data fields to be transmitted to the LLM via the network.

* * * * *